United States Patent
Dörrie et al.

(10) Patent No.: US 6,659,146 B2
(45) Date of Patent: Dec. 9, 2003

(54) MOTOR VEHICLE TIRE WITH A TREAD PROFILE FOR A SUPERIOR GRIP ON SNOW AND ICE

(75) Inventors: Helge Dörrie, Garbsen (DE); Franz Diensthuber, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 44 days.

(21) Appl. No.: 10/012,350

(22) Filed: Dec. 12, 2001

(65) Prior Publication Data

US 2002/0069949 A1 Jun. 13, 2002

(30) Foreign Application Priority Data

Dec. 12, 2000 (EP) .............................. 00127194

(51) Int. Cl.$^7$ .................. B60C 11/11; B60C 11/12; B60C 107/00; B60C 115/00
(52) U.S. Cl. .................. 152/209.15; 152/209.18; 152/209.22; 152/209.28; 152/DIG. 3
(58) Field of Search .............. 152/209.15, 209.18, 152/209.22, 209.28, DIG. 3

(56) References Cited

U.S. PATENT DOCUMENTS

| | | | | |
|---|---|---|---|---|
| 2,779,060 A | * | 1/1957 | Knox | |
| 5,198,047 A | * | 3/1993 | Graas et al. | |
| 5,301,727 A | | 4/1994 | Inoue | .......................... 152/209 |
| 5,660,651 A | * | 8/1997 | Diensthuber | |
| 5,950,700 A | * | 9/1999 | Fukuoka | |

FOREIGN PATENT DOCUMENTS

| | | | |
|---|---|---|---|
| DE | 24 32 363 | | 1/1975 |
| DE | 3943014 | * | 6/1990 |
| DE | 93 01 038.9 | | 7/1993 |
| EP | 0 485 883 | | 5/1992 |
| JP | 64-9008 | * | 1/1989 |
| JP | 5-169923 | * | 7/1993 |
| JP | 2000-108615 | * | 4/2000 |

OTHER PUBLICATIONS

Patent Abstracts of Japan, vol. 2000, No. 11, Jan. 3, 2001 and JP 2000 225814A.
Patent Abstracts of Japan, vol. 1998, No. 10, Aug. 31, 1998 and JP 10–114205A, May 6, 1998.
"Avon", Automatische Anlagen Favorisiert, CR38, p. 114 of "Gummibereifung", Jul. 1996.
"Michelin Energy", The Successors Come Along, p. 94 of "Gummibereifung", Jan. 1997.
"Mit breiten Spuren durch den Schnee", pp. 22–23 of "Gummibereifung", Nov. 1988.
European Search Report for EP 00 12 7194, dated Jul. 2, 2001.

* cited by examiner

Primary Examiner—Steven D. Maki
(74) Attorney, Agent, or Firm—Smith, Gambrell & Russell, LLP

(57) ABSTRACT

In a motor vehicle tire (1) for driving conditions as they occur during the winter months, parallel incisions are provided with staggers that are placed such that a smaller distance between adjacent incisions arises in the central region of the pad than in the marginal region of the pad.

10 Claims, 5 Drawing Sheets

MOTOR VEHICLE TIRE WITH A TREAD PROFILE FOR A SUPERIOR GRIP ON SNOW AND ICE

INTRODUCTION AND BACKGROUND

The present invention pertains to a motor vehicle tire with a tread profile for a superior grip on snow and ice.

For this purpose, the tread profile customarily contains incisions that essentially extend parallel to one another within profile positives. The expression "profile positives" is used here as a general term for "pads" or "blocks," i.e., for elevated profile regions that are not only limited in the axial direction, but also in the circumferential direction, as well as for "ribs," i.e., for elevated profile regions that are only limited in the axial direction and extend over the entire circumference.

Incisions of this type are usually, and in the present invention, distributed similar to screen lines. This means that the distance between the respective incisions is essentially constant. In this context, the term "essentially" means that the greatest distance between two incisions is not larger than the smallest distance between two incisions by more than 20%, with this definition applying to all pairs of two respectively adjacent incisions within the same profile positive. In this case, the average distance between two adjacent incisions should lie between 3 mm and 7 mm. It is preferred to maintain the incision spacing in each profile positive exactly constant within the above-described range of dimensions, at least for tires that are not intended for only one rotating direction.

It is known to design a series of incisions in such a way that they form, when viewed from the top, at least one almost perpendicularly staggered stair-like section, namely from the Semperit winter tire "Direction-Grip" that is, for example, described on pages 22 and 23 of "Gummibereifung" 11/1988. In this context, the term "almost perpendicularly" refers to an angle between 75° and 105°. The above-mentioned article also states that the length of the staggered section is no longer than half the length of the main section of the incision.

Tire experts are familiar with the fact that the stiffness of a positive without incisions referred to a radially applied force is greater in the center of the positive than on the edge of the positive. Consequently, the surface pressure is greater in the center of the positive than on the edge of the positive.

The experts are also familiar with the fact that the coefficient of friction $\mu$ increases as the pressure decreases. If the contact surface cannot be enlarged and the mass to be supported cannot be reduced, the pressure should be as constant as possible at least over the available contact surface. In connection with the facts stated in the preceding paragraph, this has led tire experts to the conclusion that measures should be taken for realizing positives similarly soft in the center and on the edge. Although DE-AS 24 32 363 (1981) aims to achieve an improved water discharge from the ground contact surface, a certain softening of the profile pad centers is already achieved with the measures described in this publication.

Information on a more effective measure, namely a pocket incision in the pad center which does not extend through the edge of the pad, can be obtained from German Utility Model M 93 01 038 (1993) or the article on Avon Tire Type CR38 on page 114 of "Gummibereifung" 7/1996.

Another measure for concentrating a pad softening caused by incisions on the pad center, in particular, on the second row of pads from the left, can be obtained from the article on the tire type "Energy" by Michelin on page 94 of "Gummibereifung" 1/1997. This measure consists of semi-pocket incisions that approximately extend in the axial direction in connection with one respective intersecting longitudinal incision. The softening of the pad is at its greatest at the incision intersections.

However, all aforementioned measures have the disadvantage that the flexural strength in the pad center is also reduced along with achieving the desired softening of the pad center referred to radially applied forces, i.e., along with the desired reduction in the compressive rigidity in the pad center. This means that tangential forces, e.g., propulsive or brake forces, result in an increased tilting of the pad sections that are separated from one another by the incisions. Although this slightly improves the grip on snow-covered roads, the coefficient of friction on icy roads which is particularly critical in situations of this type significantly deteriorates because the aforementioned tilting concentrates almost the entire surface pressure on the very small edge surfaces. In other words, the reduced flexural strength eliminates the advantage of a reduced compressive rigidity in the pad center with respect to the most critical aspect of a winter tire, namely the grip on icy roads.

Therefore, an objection of the present invention is to develop a profile geometry that reduces the compressive rigidity in the pad center and results in a higher degree of flexural strength.

SUMMARY OF THE INVENTION

The above and other objections of the invention can be achieved with a motor vehicle tire with a tread profile for a superior grip on snow and ice wherein incisions ($E_1$, $E_2$, $E_3$) that essentially extend parallel to one another are arranged within profile positives (=pads and/or ribs), wherein the distance (a) between adjacent incisions (E) of the same profile positive preferably is constant or deviates by no more than 20%, wherein the average distance ($a_m$) between two adjacent incisions (E) lies between 3 mm and 7 mm, wherein a series of incisions (E)—preferably all incisions (E)—contain at least one almost perpendicularly staggered stair-like section (E) when viewed from the top, and wherein the length (lEH) of the staggered section (Ev) amounts to no more than half the length (lEH) of the main section (EH) of the incision (E), and wherein the staggered sections (EV) are offset relative to one another in adjacent incisions ($E_1$, $E_2$) of the same profile positive, namely such that a rubber web (G) is respectively situated between said staggered sections (EV), wherein the length of the rubber web transverse to the length of the two adjacent main sections ($EH_1$, $EH_2$) only lies between 30% and 70% of the distance (a) between the main sections ($EH_1$, $EH_2$).

It is important to note the tire according to the invention is characterized by the fact that the staggered sections are offset relative to one another in adjacent incisions of the same profile positive, namely such that a rubber web is respectively situated between said staggered sections, wherein the length of the rubber web transverse to the length of the two adjacent main sections only lies between 30% and 70% of the distance between the main sections.

The length of said web along the two adjacent main sections preferably should lie between 0.6 times and 2 times the distance between the main sections.

The web has the desired lower compressive rigidity due to the vicinity of incisions on all sides; its flexural strength is, however, barely reduced due to the angular connection to the adjacent positive sections between the main sections of two respectively successive incisions.

BRIEF DESCRIPTION OF DRAWINGS

The present invention will be further understood with reference to the drawings, wherein.

DETAILED DESCRIPTION OF THE INVENTION

Figure 1:
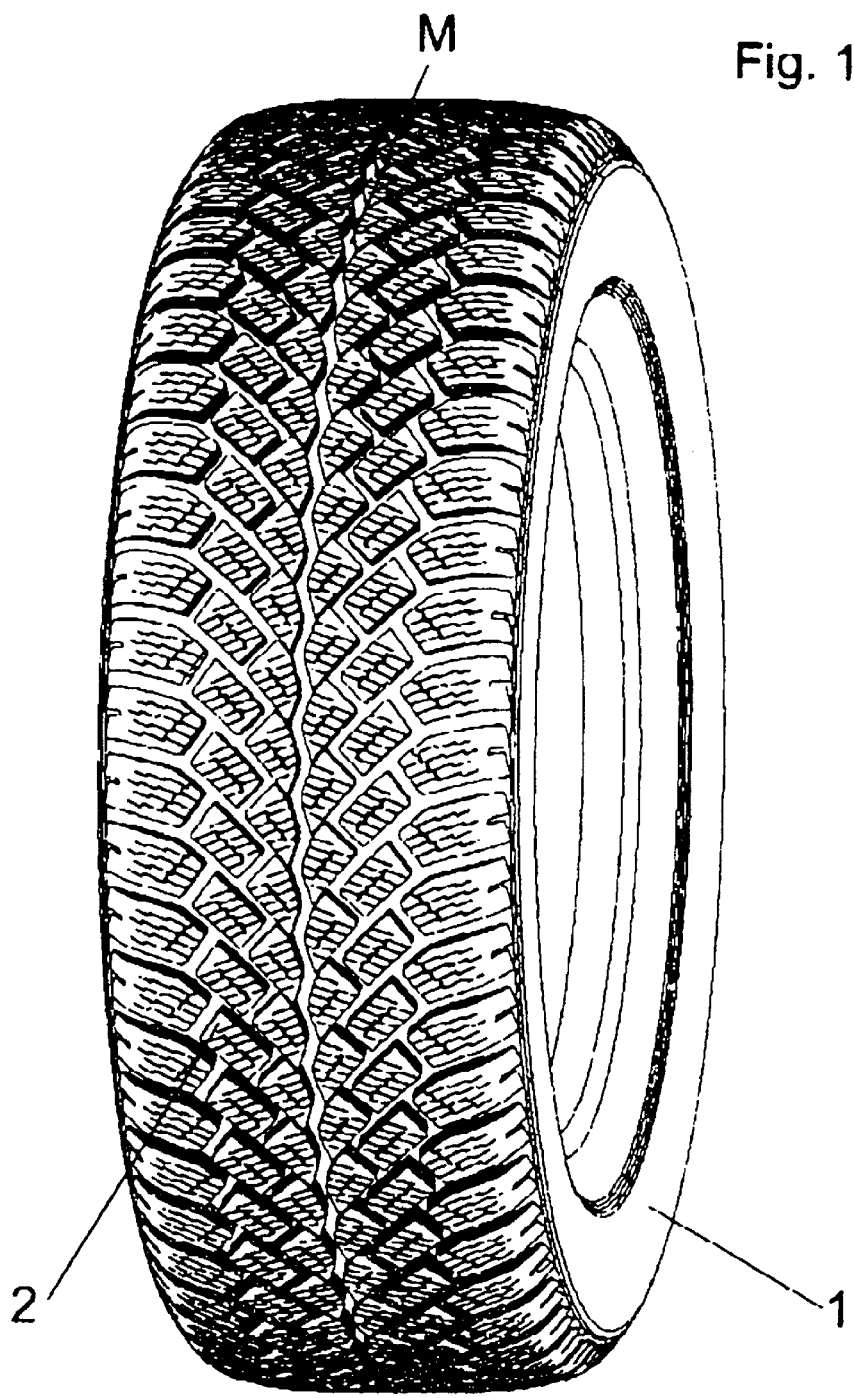
FIG. 1 is a representation to scale of a tire according to the invention in the form of an oblique view.

The advantages attained with the invention are particularly important in the central region of the tread. Due to the importance of the staggered incisions described above, it would be particularly advantageous for the central region of the tread to maximize the effect, wherein each insertion contains exactly two main sections and exactly one centrally arranged stagger. It is essential that the sequence main section-stagger main section never contain an interruption of the incision.

The invention functions so well that pocket ends of the incisions—e.g., as clearly indicated in the above-mentioned M 93 01 038, on page 114 of Gummibereifung 7/1996 and on page 91 of Gummibereifung 1/1997—can be entirely eliminated. Despite the fact that the incisions extend through the edge of the pad such that the pad is softened, said pad has an approximately uniform compressive rigidity due to the particularly high softening effect achieved with the narrow rubber webs formed by the staggers.

The thusly possible elimination of pocket ends of the incisions provides the constructive advantage that the edge length of the incisions becomes longer without requiring a costly increase in the number of incisions. It also provides an advantage with respect to the construction of the manufacturing device: thin plates, namely so-called blades, are anchored in the profile-producing segments of the vulcanization molds in order to realize the tire incisions according to the invention. At locations at which a blade is essentially straight—as required on the ends for the incisions according to the invention—a buckling problem arises when the vulcanization mold is closed, in particular, at locations situated farther from the blade stagger according to the invention. Such a two-dimensional bending (=buckling) occurs if the thickness of the blade is not sufficiently large in relation to the mold closing force; transverse forces disadvantageously superimpose on one another, in particular, at the segment boundaries, due to tangential caoutchouc flow movements.

Particularly thin incisions result in a maximum grip because they can be arranged particularly densely; however, they require correspondingly thin blades. This means that a conflict exists with respect to the dimensions of the blade thickness, namely between the device manufacturer on one hand who desires buckling-resistant and consequently thick blades and the tire manufacturer on the other hand who desires thin blades.

At locations at which an incision may extend through a pad edge in the tire, the blade that produces the incision may be additionally mounted in the vulcanization mold on the cast web of the vulcanization mold which produces the profile groove that limits the pad in the tire. Due to this additional support of the blade at the location that is otherwise most sensitive to buckling, particularly thin blade dimensions can be realized. With respect to the most popular tire widths (175 up to 195), the smallest possible blade thickness lies at approximately 0.4 mm.

According to the invention, the length of the main section preferably lies between 1.5 times and 3 times the average distance ($a_m$) between adjacent incisions (E). In instances in which the incision length is, for example, 24 mm due to the pad geometry, i.e., in instances in which each main section is approximately 12 mm long, the average distance between adjacent incisions consequently should lie between 8 mm and 4 mm.

In smaller pads for particularly narrow tire sizes (165 and below) and correspondingly shorter main sections of the incisions, it is advantageous to choose a smaller incision spacing in order to make available a sufficient edge length sum for gripping on snow-covered roads despite the smaller ground contact surface. Since the support effect on the blade edge is even more defined due to the shorter blade length, the blade thickness can be additionally reduced, for example, to 0.35 mm.

In wider tires (205 and above), it is preferred to either provide another row of pads in addition to the preferred arrangement of six rows shown, or the incision spacing is increased in accordance with the required increase in the blade thickness, for example, to 0.5 mm.

An insufficient incision spacing would excessively reduce the flexural strength of the positive parts remaining between the incisions and, due to the end face tilting, result in an insufficiently uniform pressure distribution and thusly an inferior coefficient of friction on icy roads and dry roads. An excessive incision spacing would, in contrast, excessively decrease the grip on snow-covered roads due to the associated reduction in the edge length sum.

The invention is preferably combined with the proven characteristic that the axially outer profile positives are longer in the axial direction than the profile positives in the central region of the tread. In order to also utilize the invention in this respect—although with a lesser but still positive effect—the incisions ($E_3$) should be staggered several times in the axially outer profile positives.

In order to achieve the best transmission of longitudinal forces possible, the main sections of the incisions should extend exactly axially, i.e., at an angle of 90° referred to the circumferential direction when viewed from the top; however, the main sections would not contribute to the ability to transmit cornering forces if they are aligned in this fashion. A comparatively significant increase in the ability to transmit cornering forces which only results in a slight deterioration can be achieved by realizing the incisions with an incline of 10°–30° referred to the axial direction. This is synonymous with an incline of 60°–80° referred to the circumferential direction.

An additional feature of the invention is based on pads in the central region of the tread that, if viewed from the top, approximately have such a rectangular shape that at least the leading edge of each pad is longer than the two directly—approximately perpendicular—adjacent edges of the same pad.

Thus, the main sections of the incisions are inclined by 15°–60° referred to the orthogonal line on the leading pad edge, and the said angle is inclined in such a direction that the main sections of the incision are inclined referred to the circumferential direction by a greater angle than the aforementioned leading pad edge.

In order to explain the importance of this angle, definitions for a few terms are required: in this case, the angle between the orthogonal line on the leading pad edge and the main sections of the incisions is referred to as "α"

the distance (shortest distance) between the main sections of adjacent incisions is referred to as "a,"

the distance (shortest distance) between the left main section of one incision and the right main section of the other, adjacent incision (=length of the web that is identified by the reference symbol "G" and axially formed between two incision staggers measured in approximately the circumferential direction) is referred to as "$g_y$,"

the distance between the stagger of one incision and the stagger of the adjacent incision to be measured in the direction of the main sections of the incisions (=length of G in approximately the axial direction) is referred to as "$g_x$,"

and the length of the incision stagger is referred to as "$l_{EV}$."

The staggered sections of the incisions may lie approximately perpendicular to the main sections of the incisions. This prevents acute angles on the positive which make it difficult to remove the positive from the mold and results in high flexural strength of the positive sections. The term "approximately perpendicular" is specified here in the form of an angular range between 75° and 95° referred to the respectively adjacent main sections of the incisions.

In order to additionally simplify the description, it is assumed that the aforementioned angle is 90°. Based on this assumption, the equation shown below applies to the approximately axial length $g_x$ of the web G:

$$g_x = a \tan \alpha$$

wherein the equation shown below applies to $g_y$:

$$g_y = a - l_{EV}$$

and wherein the equation shown below consequently applies to the surface AG of the web G which has reduced compressive rigidity:

$$AG = g_x \, g_y = a \, (a - l_{EV}) \tan \alpha.$$

In addition to the fact that the invention manifests itself in a particularly large portion of the surface of a positive if the—squared—dimension a is large (which means that the invention is also suitable for tires in which a large number of blades is not installed into a vulcanization mold for price reasons), this equation also indicates an initially linear dependence on α that increases superproportionally as α additionally increases.

The question by how much the compressive rigidity in the web G according to the invention is lowered primarily depends on the ratio between the stagger length $l_{EV}$ and the incision spacing a. In this case, an increase of this ratio results in a more significant drop in the compressive rigidity. This also depends secondarily on the surface $A_G$: if the surface that has reduced compressive rigidity is increased, the drop in the compressive rigidity is slightly reduced.

The surface $A_G$ can also be increased by reducing the angle δ; however, this is not explained with the aid of another equation. As mentioned previously, this angle should not be increased beyond 75° in order to simplify the removal of the positive from the mold.

Figure 5:
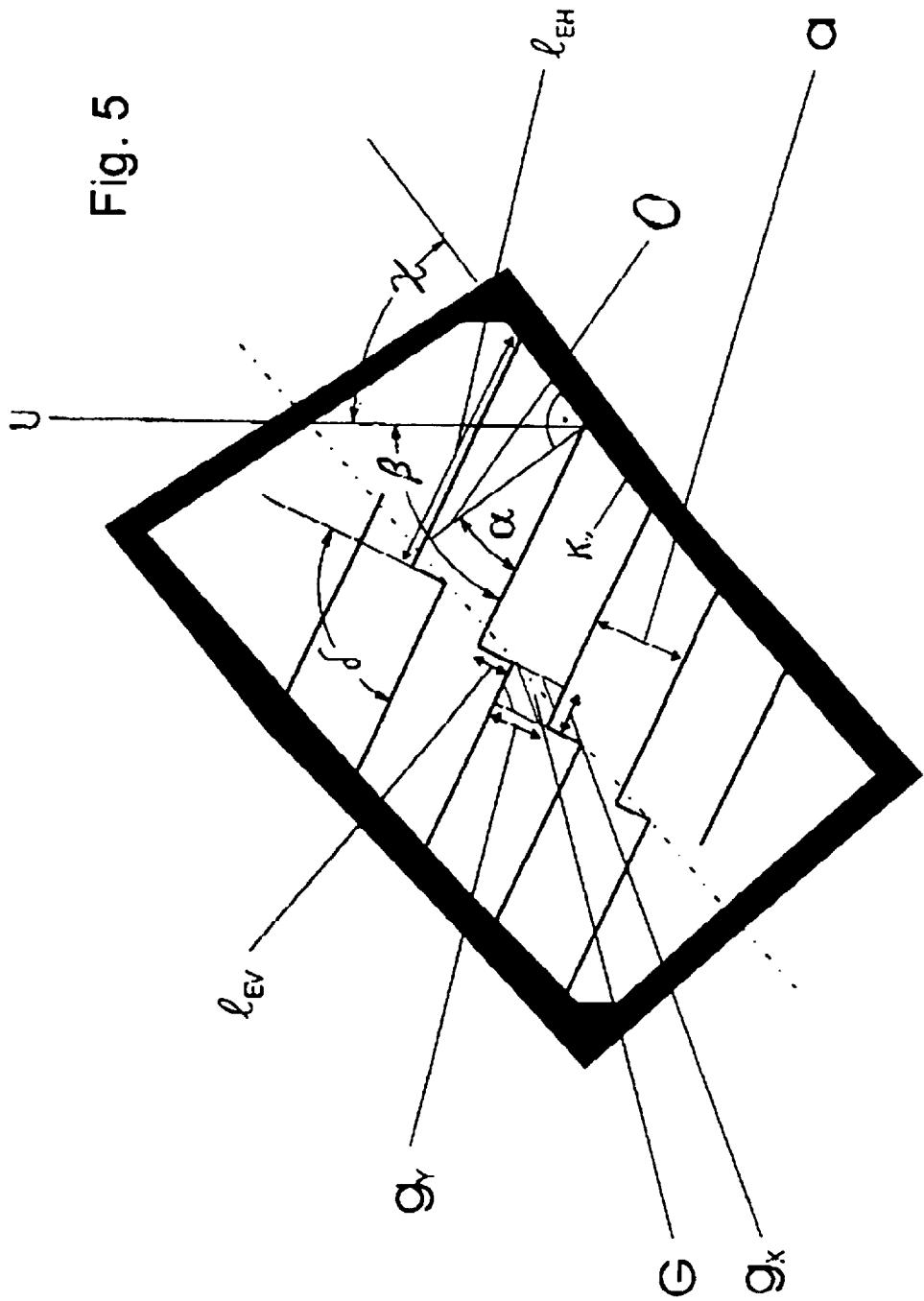
FIG. 5 is a detail view of the same pad as in FIG. 4, on an even slightly larger scale, wherein the reference symbols are concentrated on dimensional relations as far as they influence the effect of the invention.

The previously described influences of dimensional variations make it possible for a person skilled in the art to realize a uniform pressure distribution by choosing the most suitable value for a reduction in the compressive rigidity in the pad center, as well as the most favorable size of the surface which has reduced compressive rigidity. Due to this generalized disclosure, the scope of protection is not limited to the embodiment described below with reference to five figures. FIG. 5 illustrates the interrelated dimensions.

As in the customary manufacture of tires, in this embodiment the leading pad edge of each pad in the central region of the tread extends at an angle χ between 40° and 60° referred to the circumferential direction. The central region of the tread customarily amounts to 55%–75% of the contact surface width.

FIG. 1 shows a correct scale oblique view of a complete tire 1 according to the invention with its tread and the profile 2 produced therein. The center of this tread profile 2 contains an undulated central groove M. Two rows of profile pads are respectively arranged to the left and to the right of this central groove, with these rows of profile pads together forming the central region of the tread. One respective row of shoulder pads is situated axially outward in the rows of profile pads, wherein the shoulder pad rows gradually transform into a lateral decor toward the edge which only comes in contact with curbstones.

Since the essential aspects of the invention can be better explained with reference to the simplified variation of the embodiment shown in FIG. 3 rather than the variation shown in FIG. 2, the former figure is described first. In this case, a larger scale than in FIG. 1 was chosen for this detail of a developed view of the tread profile 2 which is projected onto a plane surface—namely in order to better illustrate the characteristics of the invention.

This figure shows two different types of incisions E according to the invention, namely incisions $E_1$ and $E_2$ that are staggered once and situated in the four rows of pads 3 of the central tread region, and incisions $E_3$ that are staggered twice and thrice and situated in the left and the right row of shoulder pads 4. The effect is particularly evident with the single staggered incisions $E_1$ and $E_2$ and consequently described in greater detail below with reference to FIGS. 4 and 5.

Figure 2:
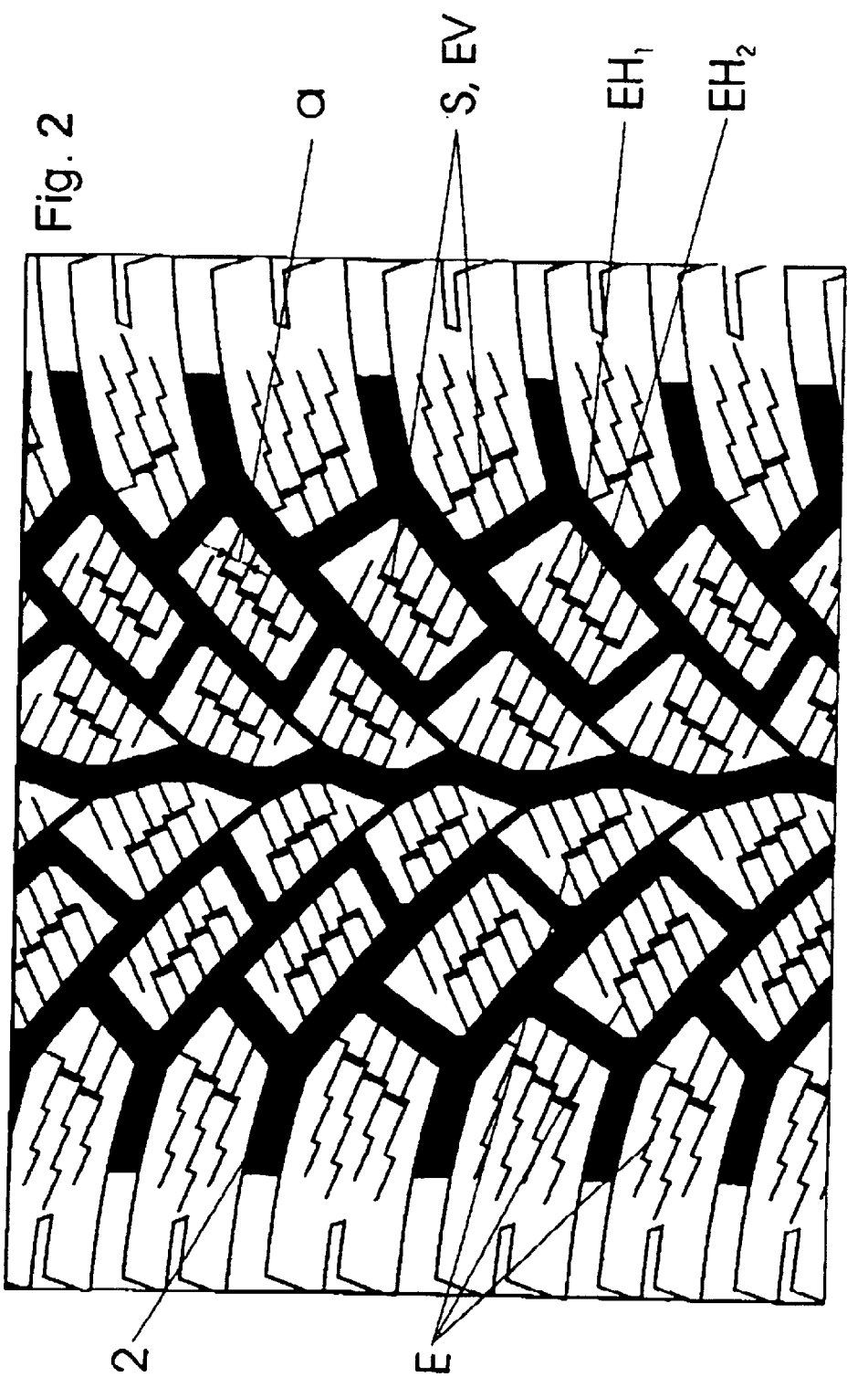
FIG. 2 is a detail view of the tread profile of the tire according to FIG. 1 which is projected onto a plane surface.
Figure 3:
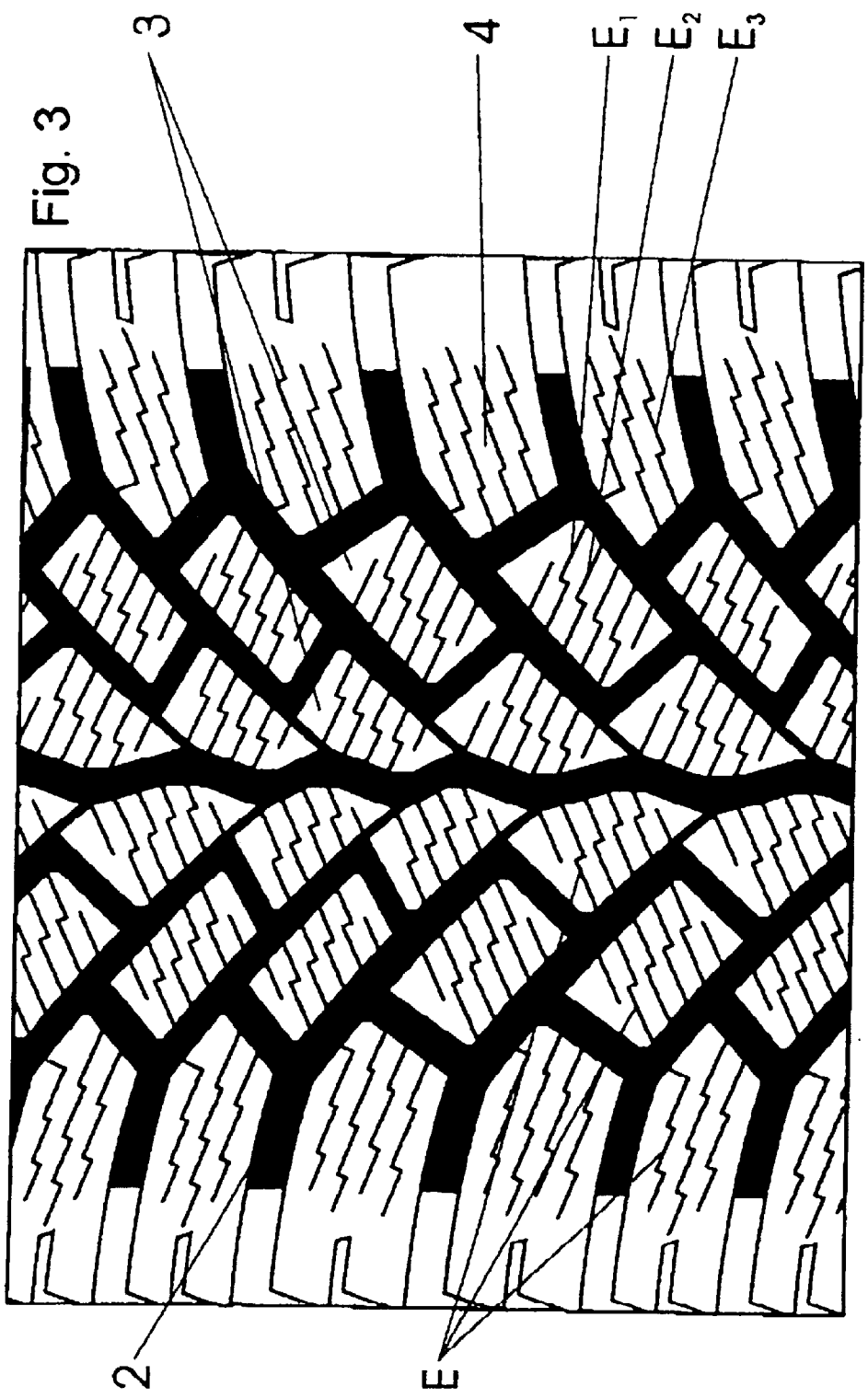
FIG. 3 is a detail view of a second variation of the tread profile which is illustrated analogous to FIG. 2, wherein sinks between the incisions are not provided in the region of the incision staggers.
Figure 4:
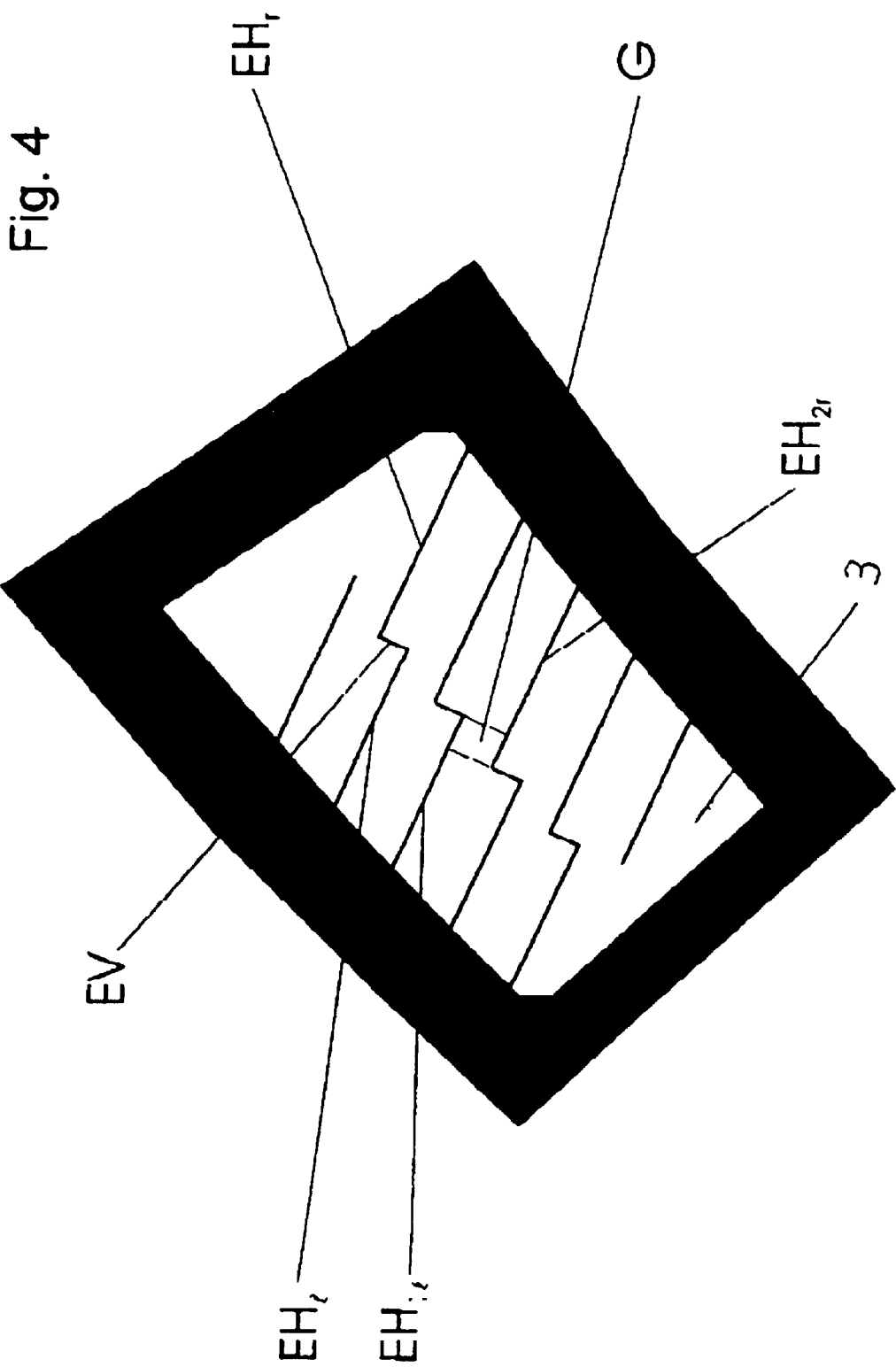
FIG. 4 is a detail view of FIG. 3 which essentially shows only one pad on an even larger scale.

According to an additional development of the embodiment according to FIGS. 3, 4 and 5, the variant of the tread profile 2 shown in FIG. 2—to which the description returns at this point—is characterized by the fact that small sinks S are arranged between the incisions E in the region of the incision staggers EV. This figure is illustrated analogous to FIG. 3, in particular, the same scale referred to the same tire size was chosen. FIG. 2 shows the same tire 1 as FIG. 1.

The small sinks S barely change the stiffness distribution in the tread profile and only reduce the total surface of the positives within the contact area insignificantly. The noise development is not increased due to the small size of these sinks S in relation to the width of the adjacent incisions—although a person skilled in the art would normally expect an increase in the noise development with pocket negatives.

The numerous small sinks S at the staggers EV of the incisions E improve the microdrainage from the incisions. This improves the discharge of melt water from the ground contact surface. In contrast to wet roads on which significantly larger quantities of water are introduced into the contact area from the contact area inlet and, as far as possible, discharge in the front third of the contact area, a thin water film is only produced in the contact area itself when driving on ice due to melting.

The thusly created water quantity naturally depends on the ice temperature; warm ice produces relatively large quantities of melt water. This is the reason why it is particularly difficult to drive on roads covered with warm ice.

Although the water quantities in case of warm ice are smaller than those on wet roads, the decrease in grip is particularly significant because the ice is nearly smooth. This means that a very small quantity of water can cause a complete separation of the tread from the solid ground.

In order to improve the most difficult aspect of a winter tiregrip on icy roads without spikes—the inventors, after arriving at the previously described conclusions, propose to produce very finely distributed water receptacles in the tread which are able to rapidly receive the slightest quantities of water. Each of the aforementioned sinks represents such a water receptacle. Since the quantity of water to be received is small and the number of sinks is—in order to realize extremely short discharge paths—relatively high, the dimensions of each sink can be extremely small, namely so small that they are barely recognizable on the scale illustrated in FIG. 1. These sinks preferably consist of a mere incision widening in the region of each incision stagger EV.

Each sink S preferably is only realized deep, in particular, down to the base of the profile, in the region of the respective incision stagger EV as shown in FIG. 3; the visible extension of the sink S up to the next incision E is only of esthetic importance and preferably has a depth of only 1 mm.

According to another feature of the invention, preferred sinks essentially have the shape of a rectangle or a parallelogram when viewed from the top. Such a design results in the least impairment of the effect of the profile positives and can be easily manufactured. It is particularly preferred that the width of the sinks corresponds to 0.1 times–0.3 times the distance a between the main incision sections $EH_1$ and $EH_2$.

FIG. 4 shows a detail of FIG. 3 on an even slightly larger scale, with said detail essentially containing only one pad 3 in the central region of the tread.

Except for the first and the last incision which are respectively realized in the form of semi-pocket incisions, all other incisions are divided into three sections, namely a left main section $EH_1$, a staggered section EV situated to the right thereof and a right main section $EH_r$ situated to the right of the staggered section. The interaction between the left main section $EH_1/$ of the incision $E_1$ and the right main section $EH_{2r}$ of the incision $E_2$ can be elucidated by observing an arbitrary pair of two adjacent incisions $E_1$ and $E_2$ as they are indicated in the preceding FIG. 3 (but not in FIG. 4 so as to not overload the figure with graphics): a web-like region G, namely a narrower positive section, is formed between the main sections of the incisions. This narrowing causes the desired reduction in the compressive rigidity. The boundary drawn with the thinnest line to the left and to the right of G merely represents an imaginary line that serves for specifying the new term "web G."

The effect of producing a narrowing of the web or positive which was described above with reference to an arbitrary pair of successively arranged and offset incisions preferably also applies to all other pairs of successively arranged and offset incisions.

FIG. 5 shows the same pad as FIG. 4—on an even slightly larger scale—wherein the reference symbols are concentrated on dimensional relations as far as they influence the effect of the invention. This figure refers to the dimensions discussed above.

This figure also shows the angle β between the circumferential direction U and the main sections of the incisions, as well as the angle χ between the leading pad edge $K_V$ and the circumferential direction U.

The following list of reference symbols forms part of the description:

1 Motor vehicle tire
2 Tread profile
3 Profile positives in the central tread region
4 Profile positives in the marginal tread region (=shoulder pads)
a Distance between two adjacent incisions
$a_m$ Average distance between two adjacent incisions (E)
E Incisions
$E_1$ A first arbitrarily selected incision of a series of parallel incisions that form a pattern
$E_2$ A second incision in the central tread region that is situated adjacent to $E_1$ and belongs to the same series of parallel incisions
$E_3$ Parallel incisions in the marginal regions of the tread which form a slightly different pattern
EV Stair-like staggered section of an incision (E)
EH Main sections of an incision (E)
$EH_1$ Main sections of a certain incision $E_1$
$EH_2$ Main sections of a certain incision $E_2$
$EH_l$ Main section of an incision (E) to the left of the staggered section EV
$EH_r$ Main section of an incision (E) to the right of the staggered section EV
$EH_{1l}$ Main section of a certain incision $E_1$ to the left of its staggered section $EV_1$
$EH_{2r}$ Main section of a certain incision $E_2$ to the right of its staggered section $EV_2$
$l_{EV}$ Length of the staggered section (EV)=staggered section length
$l_{EH}$ Length of the main section (EH)=main section length
G Rubber web
$K_V$ Leading pad edge
M Central groove in 2
O Orthogonal to KV
S Small sinks between the incisions E in the region of the incision staggers EV (FIGS. 1 and 2)
α Incline of EH referred to O
β Incline of EH referred to U
χ Incline of $K_V$ referred to U
δ Incline of EH referred to EV Further variations and modifications of the foregoing will be apparent to those skilled in the art and are intended to be encompassed by the claims appended hereto.

European application 00127194.9 of Dec. 12, 2001 is relied on and incorporated herein by reference.

We claim:
1. Motor vehicle tire with a tread profile for a superior grip on snow and ice wherein a plurality of incisions ($E_1$, $E_2$, $E_3$) that essentially extend parallel to one another are arranged within profile positives, each incision comprising main sections (EH), wherein the distance (a) between the main sections (EH) of adjacent incisions (E) of the same profile positive is constant or deviates by no more than 20%, wherein the average distance ($a_m$) between two adjacent incisions (E) lies between 3 mm and 7 mm, wherein each of the incisions (E) contain at least one staggered section (EV) joined to the main sections (EH) so as to define a stair shape when viewed from the top, the staggered section (EV) being almost perpendicular to the main sections (EH), and wherein the length ($l_{EV}$) of the staggered section (EV) amounts to no more than half the length ($l_{EH}$) of each main section (EH) of the incision (E), wherein the staggered sections (EV) are offset relative to one another in adjacent incisions ($E_1$, $E_2$) of the same profile positive, such that a rubber web (G) is respectively situated between said staggered sections (EV), wherein the length of the rubber web transverse to the length of the two adjacent main sections ($EH_1$, $EH_2$) of the adjacent incisions only lies between 30% and 70% of the distance (a) between the main sections ($EH_1$, $EH_2$) of the adjacent incisions at a location spaced from the rubber web.

2. The motor vehicle tire according to claim 1, wherein the length of the main section amounts to 1.5 times–3 times the average distance ($a_m$) between adjacent incisions (E).

3. The motor vehicle tire according to claim 2, wherein the profile positives comprise axially outer profile positives and profile positives in a central region of said tread, the axially outer profile positives have a greater length in the axial direction than that of the profile positives in the central region of the tread, and each of the incisions ($E_3$) in the axially outer profile positives are staggered several times so as to comprise several staggered sections.

4. The motor vehicle tire according to claim 3, wherein the incisions ($E_1$, $E_2$) in the profile positives of the central tread region are only staggered once.

5. The motor vehicle tire according to claim 1, wherein the main section (EH) of each of the incisions ($E_1$, $E_2$, $E_3$) is inclined referred to the circumferential direction by an angle ($\beta$) between 60° and 80°.

6. The motor vehicle tire according to claim 1, wherein
the profile positives of the central tread region are realized in the form of pads that have an approximately rectangular shape when viewed from the top, and at least the leading edge ($K_V$) of each of these pads is longer than the two directly adjacent edges of the same pad, the main section (EH) of each of the incisions ($E_1$, $E_2$) is inclined referred to the orthogonal (O) to the leading pad edge ($K_V$) by an angle (a) between 15° and 60°, and wherein said angle (a) is inclined in such a direction that the main section (EH) of each of the incisions ($E_1$, $E_2$) is inclined referred to the circumferential direction (U) by a greater angle ($\beta$) than the angle ($\chi$) of the leading pad edge ($K_V$).

7. The motor vehicle tire according to claim 6, wherein the staggered section (EV) of each of the incisions ($E_1$, $E_2$) extends at an angle ($\delta$) between 75° and 95° relative to the respectively adjacent main sections (EH) of the incisions, ($E_1$, $E_2$).

8. The motor vehicle tire according to claim 6, wherein the leading pad edge ($K_V$) of each pad (3) in the central tread region extends an angle ($\chi$) between 40° and 60° referred to the circumferential direction.

9. The motor vehicle tire according to claim 1, wherein at least a few incisions ($E_1$, $E_2$) in the central tread region each contain a sink (S) that essentially has the shape of a rectangle or a parallelogram when viewed from the top, wherein each said sink is adjacent to a staggered section (EV).

10. The motor vehicle tire according to claim 9, wherein the sink length corresponds to the distance (a) between the two main incision sections ($EH_1$, $EH_2$) that are aligned with the sink, and the sink width corresponds to 0.1-times–0.3-times the distance (a).

* * * * *